United States Patent
Duan et al.

(10) Patent No.: US 10,775,762 B2
(45) Date of Patent: Sep. 15, 2020

(54) DATA CONVERTER, SIGNAL TRANSMISSION METHOD, AND SIGNAL TRANSMISSION SYSTEM

(71) Applicant: OMRON Corporation, Kyoto (JP)

(72) Inventors: Liang yong Duan, Shanghai (CN); Hao Zhang, Shanghai (CN)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/477,521

(22) PCT Filed: Nov. 17, 2017

(86) PCT No.: PCT/JP2017/041555
§ 371 (c)(1),
(2) Date: Jul. 11, 2019

(87) PCT Pub. No.: WO2018/146898
PCT Pub. Date: Aug. 16, 2018

(65) Prior Publication Data
US 2019/0339665 A1 Nov. 7, 2019

(30) Foreign Application Priority Data
Feb. 9, 2017 (CN) .......................... 2017 1 0070787

(51) Int. Cl.
*H04B 1/04* (2006.01)
*G05B 19/05* (2006.01)
*H04L 29/08* (2006.01)

(52) U.S. Cl.
CPC ............. *G05B 19/054* (2013.01); *H04B 1/04* (2013.01); *H04L 67/12* (2013.01); *G05B 2219/1105* (2013.01)

(58) Field of Classification Search
CPC ........... H04L 67/12; H04L 67/10; H04B 1/04; G05B 19/4183; G05B 19/054;
(Continued)

(56) References Cited

U.S. PATENT DOCUMENTS

2003/0195722 A1* 10/2003 Buda ...................... G05B 19/05
702/188

FOREIGN PATENT DOCUMENTS

| CN | 103309293 | 9/2013 |
| CN | 104121985 | 10/2014 |

(Continued)

OTHER PUBLICATIONS

"International Search Report (Form PCT/ISA/210) of PCT/JP2017/041555," dated Dec. 26, 2017, with English translation thereof, pp. 1-3.

(Continued)

*Primary Examiner* — Rahel Guarino
(74) *Attorney, Agent, or Firm* — JCIPRNET

(57) ABSTRACT

A data converter, a signal transmission method, and a signal transmission system for transmitting a signal to a programmable logic controller are provided. The data converter: performs sampling multiple times with respect to data detected by a sensor in one communication period of communication with a programmable logic controller; acquires statistical data by statisticizing a plurality of sampling data in the one communication period; and transmits the statistical data to the programmable logic controller when the one communication period is reached. Therefore, a signal sampling density is improved, and thus control accuracy can be enhanced. At the same time, a data transmission amount of a bus is reduced, a load on the programmable logic controller is reduced, and user convenience is improved.

10 Claims, 3 Drawing Sheets

(58) Field of Classification Search
CPC ............ G05B 19/4185; G05B 23/0221; G05B 19/4184; G05B 19/0423; G05B 19/042; G05B 2219/25268; G05B 2219/1105
See application file for complete search history.

(56) References Cited

FOREIGN PATENT DOCUMENTS

| | | |
|---|---|---|
| CN | 104742126 | 7/2015 |
| CN | 104949711 | 9/2015 |
| CN | 204694295 | 10/2015 |
| CN | 105928613 | 9/2016 |
| JP | H05235761 | 9/1993 |
| JP | 2002152043 | 5/2002 |
| JP | 2002533844 | 10/2002 |
| JP | 2006070079 | 3/2006 |
| JP | 2011090500 | 5/2011 |
| JP | 2011193148 | 9/2011 |
| JP | 2012112950 | 6/2012 |
| JP | 2013186621 | 9/2013 |
| JP | 2015123538 | 7/2015 |
| JP | 2015125389 | 7/2015 |
| JP | 2016039610 | 3/2016 |

OTHER PUBLICATIONS

"Written Opinion of the International Searching Authority (Form PCT/ISA/237) of PCT/JP2017/041555," dated Dec. 26, 2017, with English translation thereof, pp. 1-6.

"International Preliminary Report on Patentability (Form PCT/IPEA/409) of PCT/JP2017/041555," completed on Oct. 9, 2018, with English translation thereof, pp. 1-6.

"Office Action of Japan Counterpart Application", dated Jun. 15, 2020, with English translation thereof, pp. 1-10.

"Office Action of China Counterpart Application", dated Apr. 15, 2020, with English translation thereof, p. 1-p. 19.

\* cited by examiner

DATA CONVERTER, SIGNAL TRANSMISSION METHOD, AND SIGNAL TRANSMISSION SYSTEM

CROSS-REFERENCE TO RELATED APPLICATION

This application is a 371 application of the international PCT application serial no. PCT/JP2017/041555, filed on Nov. 17, 2017, which claims the priority benefit of China application no. 201710070787.2, filed on Feb. 9, 2017. The entirety of each of the abovementioned patent applications is hereby incorporated by reference herein and made a part of this specification.

TECHNICAL FIELD

The invention relates to the field of communication technology, and more particularly, to a data converter, a signal transmission method, and a signal transmission system for transmitting a signal to a programmable logic controller.

BACKGROUND ART

In the existing technology, a data converter (e.g., AD/TS/ Load Cell) communicates with a controller such as a programmable logic controller (PLC) to transmit a signal to the PLC. In a typical situation, the data converter implements data sampling one time in one communication period (e.g., 1 ms) with the PLC, and then performs analog-digital conversion to feed back the converted digital signal to the PLC.

Since the sampling period of the data converter is affected by the communication period, once the communication period gets longer, the number of sampling points in the unit time of the data converter decreases correspondingly, and a user cannot acquire enough sampling samples and cannot grasp the change in input of the PLC in a short time. Moreover, in the situation where the sampled data becomes faster over time, if sampling is performed only one time in one communication period, the sampling result may correspond to the peak or bottom position of the sampled data and may not accurately respond to the data information of the current sampled data, which may affect the control accuracy of the PLC.

It should be noted that the above introduction of the technical background is intended to facilitate a clear and complete description of the technical proposals of the invention and is detailed to facilitate understanding for those skilled in the art. These proposals are detailed only in the background art section of the invention, and the above technical proposals cannot be determined to be known to those skilled in the art.

SUMMARY OF THE INVENTION

Problems to be Solved by the Invention

The inventors can solve the above problem by using oversampling techniques in the data converter, e.g., performing sampling multiple times in one communication period. However, in the situation where the data converter performs sampling multiple times in one communication period and feeds back the sampling result of each time in the communication period, although the sampling density is secured, it is necessary to feed back the sampling result of each time, and the communication overhead and the PLC processing stress are increased, which thus affects the feedback rate of the sampling results and is unfavorable for the PLC to perform control accurately. At the same time, it was found that since the data converter feeds back a large amount of raw information, in order to acquire the useful information, the user needs to perform data processing for a second time on the PLC side, which makes the user's use inconvenient.

In order to solve the above problem, embodiments of the invention provide a data converter, a signal transmission method, and a signal transmission system for transmitting a signal to a programmable logic controller, which can improve the sampling density of signals of the data converter to improve the control accuracy, and at the same time, reduce the data transmission amount of the bus, reduce the load on the programmable logic controller, and make the user's use convenient.

Means for Solving the Problems

According to a first aspect of the embodiments of the invention, a data converter for transmitting a signal to a programmable logic controller is provided, the data converter including a sampling unit for performing sampling multiple times with respect to data detected by a sensor in one communication period of communication with the programmable logic controller; a processing unit for acquiring statistical data by statisticizing a plurality of sampling data in the communication period; and a transmission unit for transmitting the statistical data to the programmable logic controller when the communication period is reached.

According to a second aspect of the embodiments of the invention, in the data converter according to the first aspect, a data amount of the statistical data is less than a data amount of the plurality of sampling data.

According to a third aspect of the embodiments of the invention, in the data converter according to the first aspect, the statistical data include at least one or more of a maximum value, a minimum value, and an average value of the plurality of sampling data.

According to a fourth aspect of the embodiments of the invention, the data converter according to the first aspect further includes a setting unit for setting a type of the statistical data based on control information of the programmable logic controller.

According to a fifth aspect of the embodiments of the invention, a signal transmission method for use in a data converter which communicates with a programmable logic controller is provided, the signal transmission method including a step of performing, by the data converter, sampling multiple times with respect to data detected by a sensor in one communication period of communication with the programmable logic controller; a step of acquiring, by the data converter, statistical data by statisticizing a plurality of sampling data in the communication period; and a step of transmitting, by the data converter, the statistical data to the programmable logic controller when the communication period is reached.

According to a sixth aspect of the embodiments of the invention, in the signal transmission method according to the fifth aspect, a data amount of the statistical data is less than a data amount of the plurality of sampling data.

According to a seventh aspect of the embodiments of the invention, in the signal transmission method according to the fifth aspect, the statistical data include at least one or more of a maximum value, a minimum value, and an average value of the plurality of sampling data.

According to an eighth aspect of the embodiments of the invention, the signal transmission method according to the fifth aspect further includes a step of setting, by the data converter, a type of the statistical data based on control information of the programmable logic controller.

According to a ninth aspect of the embodiments of the invention, a signal transmission system including a data converter and a programmable logic controller is provided. The data converter communicates with the programmable logic controller. The data converter performs sampling multiple times with respect to data detected by a sensor in one communication period of communication with the programmable logic controller, acquires statistical data by statisticizing a plurality of sampling data in the communication period, and transmits the statistical data to the programmable logic controller when the communication period is reached. The programmable logic controller receives the statistical data transmitted by the data converter.

According to a tenth aspect of the embodiments of the invention, a signal transmission system including a sensor, a data converter, and a programmable logic controller is provided. The data converter communicates with the sensor and the programmable logic controller, respectively. The sensor performs data detection. The data converter performs sampling multiple times with respect to data detected by the sensor in one communication period of communication with the programmable logic controller, acquires statistical data by statisticizing a plurality of sampling data in the communication period, and transmits the statistical data to the programmable logic controller when the communication period is reached. The programmable logic controller receives the statistical data transmitted by the data converter.

Effects of the Invention

The beneficial effect of the invention is that the invention can significantly improve the sampling density of the signals to improve the control accuracy, and at the same time, voluntary data analysis is performed by the data converter, which reduces the data transmission amount of the bus, reduces the load on the main control unit, and makes the user's use convenient.

Referring to the following description and the drawings, the specific embodiments of the invention will be disclosed in detail to indicate the manner in which the principles of the invention may be employed. It should be understood that the embodiments of the invention are not limited in scope. Within the scope of the spirit and terms of the appended claims, the embodiments of the invention include various modifications, corrections, and equivalents.

The features described and/or shown in an embodiment may be used in the same or similar manner in one or more other embodiments, may be combined with the features in other embodiments, or may be replaced with the features in other embodiments.

It should be emphasized that the term "comprise/include" as used herein refers to the presence of a feature, a whole, a step, or a constituting element but does not exclude the presence or addition of one or more other features, wholes, steps, or constituting elements.

BRIEF DESCRIPTION OF THE DRAWINGS

The drawings included in the following embodiments are used to further understand the embodiments of the invention. They form part of the specification and are used to illustrate the embodiments of the invention to explain the principles of the invention together with the text description. Obviously, the drawings in the following description are merely examples of the invention, and it is also possible for those skilled in the art to obtain other drawings based on these drawings on the premise of not taking creative work.

DESCRIPTION OF THE EMBODIMENTS

The foregoing and other features of the invention will be apparent from the following description with reference to the drawings. In the description and the drawings, specific embodiments of the invention will be specifically disclosed and some embodiments that can adopt the principles of the invention will be shown. It should be understood that the invention is not limited to the described embodiments, but on the contrary, the invention includes all corrections, modifications, and equivalents that fall within the scope of the claims.

Currently, by using oversampling techniques, a data converter may perform sampling multiple times in one communication period and feed back a sampling result of each time in the communication period.

Figure 1:
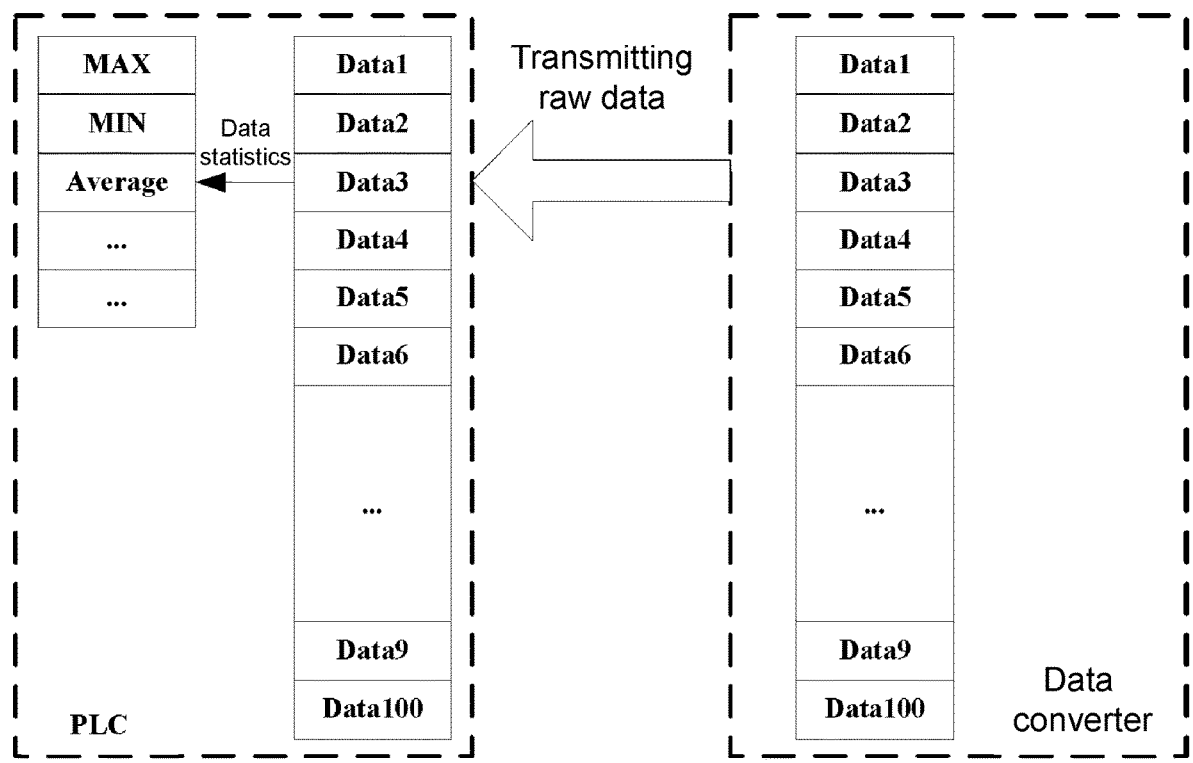
FIG. 1 is a schematic view of the content of signals transmitted to a PLC by a data converter using oversampling techniques.

FIG. 1 is a schematic view of the content of signals transmitted to a PLC by a data converter using oversampling techniques. As shown in FIG. 1, assuming that the communication period is 10 ms, then the sampling period of the data converter is 100 µs. By using oversampling techniques, the data converter may perform sampling up to one hundred times in each communication period and transmit the sampling results of the one hundred times to the PLC. The PLC receives the sampling results of the one hundred times, and the user completes data statistics of the sampling results by a ladder program of the PLC.

However, as mentioned above, the above method affects the feedback rate of the sampling results and is unfavorable for the PLC to perform control accurately. Embodiments of the invention will be described in detail below.

Embodiment 1

Embodiment 1 of the invention provides a data converter for transmitting a signal to a PLC.

Figure 2:
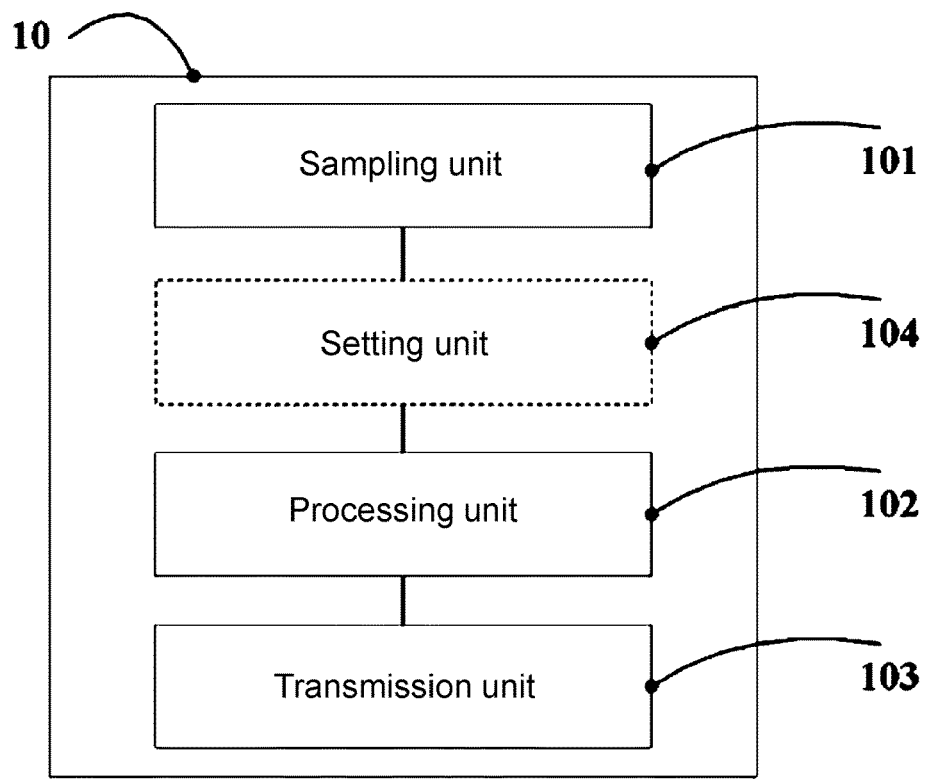
FIG. 2 is a schematic configuration view of a data converter for transmitting a signal to a PLC according to Embodiment 1 of the invention.

FIG. 2 is a schematic configuration view of a data converter for transmitting a signal to a PLC according to Embodiment 1 of the invention. As shown in FIG. 2, a data converter 10 includes a sampling unit 101, a processing unit 102, and a transmission unit 103.

The data converter 10 communicates with the PLC, and the sampling unit 101 performs sampling multiple times with respect to data detected by a sensor in one communication period. The processing unit 102 acquires statistical data by statisticizing a plurality of sampling data in the communication period. When the communication period is reached, the transmission unit 103 transmits the statistical data statisticized by the processing unit 102 to the corresponding PLC.

In the present embodiment, the sampling unit 101 performs sampling multiple times with respect to the data detected by the sensor in one communication period, and performs analog-digital conversion on the data acquired by sampling to acquire digital signals. As a result, the sampling density of the data converter can be improved to improve the control accuracy.

In the present embodiment, the processing unit 102 generates the statistical data by statisticizing the digital signals acquired by sampling in the communication period. For example, information such as the maximum value, the minimum value, or the average value of the plurality of digital signals may be generated. The data amount of the statistical data is less than the data amount of the plurality of sampling data. Moreover, the processing unit 102 may further perform other types of data statistics with respect to the digital signals acquired by sampling in the communication period, as long as the information carried by the plurality of sampling data can be reflected. When the communication period is reached, the transmission unit 103 transmits the statistical data statisticized by the processing unit 102 to the PLC which communicates with the data converter 10. As a result, the data amount which the data converter 10 transmits to the PLC is reduced.

In the present embodiment, the data converter 10 performs sampling multiple times in one communication period, statisticizes the sampled data, and transmits the statisticized statistical data to the PLC. As a result, when the data converter 10 and the PLC communicate with each other through a bus, the requirement for the bus communication rate can be reduced, and it is possible to combine a means of a high sampling density with a low-cost bus. At the same time, the PLC does not have to process a large amount of information, which leaves the PLC with more processing time and shortens the control period. Also, when using the data converter 10, the user can directly acquire the useful information which has been refined, which improves the convenience in use.

Figure 3:
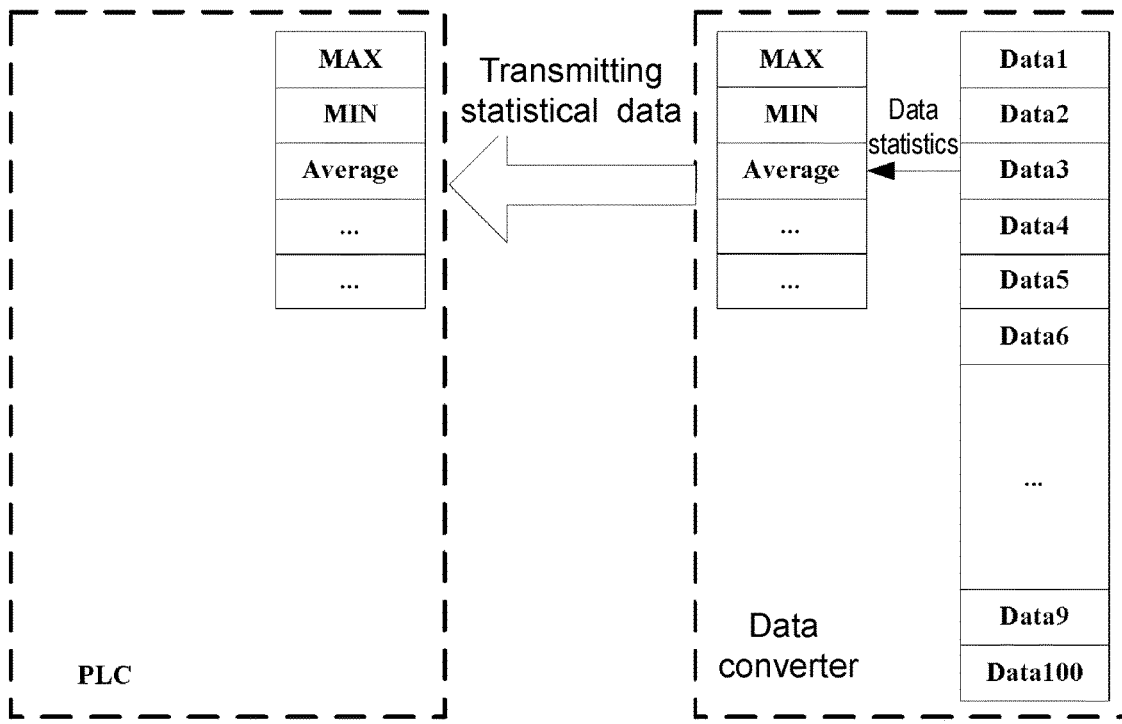
FIG. 3 is a schematic view of the content of signals transmitted to the PLC by the data converter according to Embodiment 1 of the invention.

FIG. 3 is a schematic view of the content of signals transmitted to the PLC by the data converter 10 according to Embodiment 1 of the invention. As shown in FIG. 3, assuming that the communication period is 10 ms, sampling may be performed up to one hundred times in each communication period. In one communication period, the sampling unit 101 performs sampling one hundred times with respect to the data detected by the sensor to acquire data Data 1 to Data 100. The processing unit 102 performs data statistics with respect to the sampling data of the one hundred times. For example, statistical information such as a maximum value MAX, a minimum value MIN, and an average value Average of the sampling data of the one hundred times is generated, and generally, it takes about five statistical data to respond to the representative information of the sampling data. The transmission unit 103 transmits about five statistical data statistically acquired by the processing unit 102 to the PLC.

It should be noted that the above merely schematically describes the statistical data by using the maximum value, the minimum value, and the average value as examples, and the invention is not limited thereto. For example, other statistical values such as the variance may also be used, and the specific types of statistics may also be determined according to the actual situation.

In another implementation of the present embodiment, the data converter 10 may further include a setting unit 104, as shown in FIG. 2. The setting unit 104 sets the type of the statistical data based on the control information of the PLC.

For example, the setting unit 104 sets the type of the data statistics to be performed by the processing unit 102 based on the control information of the PLC. For example, the type of data statistics is set as information such as the average value, the maximum value, the minimum value, etc. of the plurality of sampling data in one communication period.

In the present embodiment, the type of the statistical data to be fed back to the PLC is set by the setting unit 104, and the user can target and select the information to be fed back by the data converter 10 according to the actual situation to more flexibly grasp the useful information.

As can be seen from the above embodiment, the data converter performs sampling multiple times with respect to the data detected by the sensor in one communication period. The statistical data are acquired by statisticizing the plurality of sampling data. When the communication period is reached, the statistical data are transmitted to the PLC. As a result, not only is the control accuracy improved, but at the same time, voluntary data analysis is performed by the data converter, which reduces the data transmission amount of the bus, reduces the load on the main control unit, and makes the user's use convenient.

Embodiment 2

Figure 4:
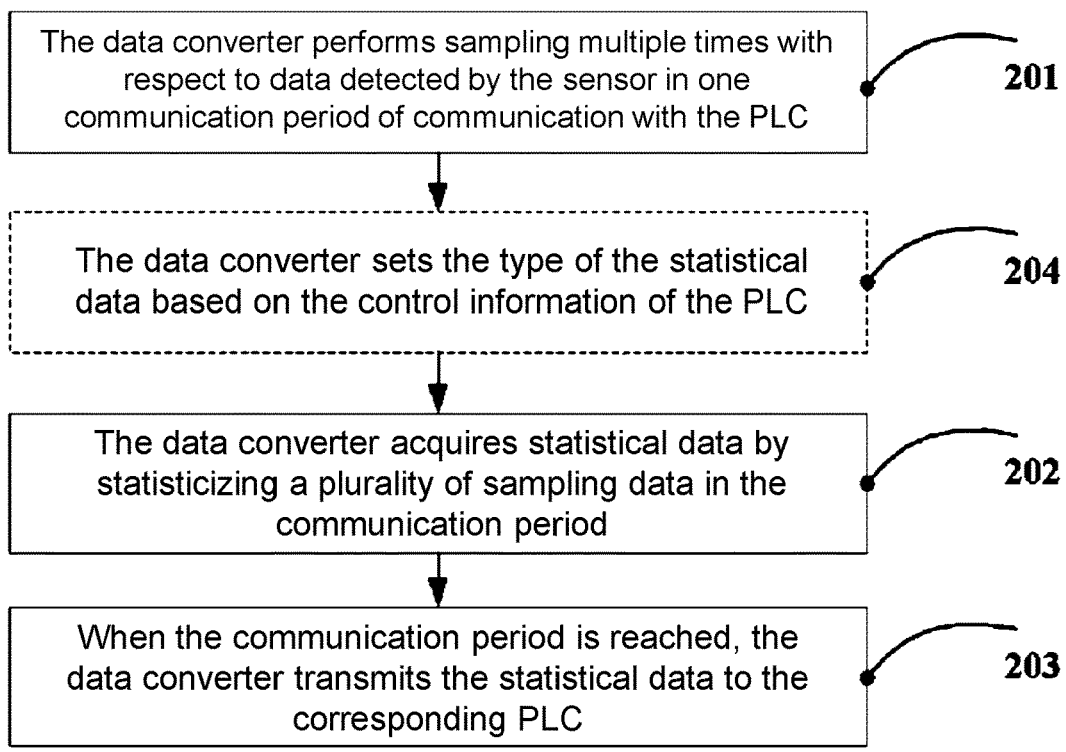
FIG. 4 is a schematic flowchart of a method for transmitting signals to the PLC corresponding to FIG. 2.

Embodiment 2 of the invention provides a signal transmission method for use in a data converter which communicates with a PLC. FIG. 4 is a schematic flowchart of a method for transmitting signals to the PLC. As shown in FIG. 4, the method includes: a step 201 of performing, by the data converter, sampling multiple times with respect to data detected by the sensor in one communication period of communication with the PLC; a step 202 of acquiring, by the data converter, statistical data by statisticizing a plurality of sampling data in the communication period; and a step 203 of transmitting, by the data converter, the statistical data to the corresponding PLC when the communication period is reached.

In step 202, when the data converter statisticizes the plurality of sampling data in one communication period, the data amount of the statistically acquired statistical data is less than the data amount of the plurality of sampling data.

In step 202, when the data converter statisticizes the plurality of sampling data in one communication period, the type of the statistical data may include at least one or more of the maximum value, the minimum value, and the average value of the plurality of sampling data, but the invention is not limited thereto and may, for example, also include other statistical values.

In the present embodiment, sampling is performed multiple times with respect to the data detected by the sensor in one communication period, data statistics are performed on the plurality of sampling data, and the statistical data are transmitted to the corresponding PLC, which can improve the sampling density of the data converter to improve the control accuracy, and at the same time, reduce the data transmission amount, reduce the load on the controller such as the PLC, and make the user's use convenient.

In an implementation of the present embodiment, as shown in FIG. 4, the method further includes: a step 204 of setting, by the data converter, the type of the statistical data based on the control information of the PLC.

In the present embodiment, the data converter sets the type of the statistical data to be fed back to the PLC based on the control information of the PLC, and the user can target and select the information to be fed back by the data converter according to the actual situation to more flexibly grasp the useful information.

Embodiment 3

Embodiment 3 of the invention provides a signal transmission system which may include the data converter described in Embodiment 1.

Figure 5:
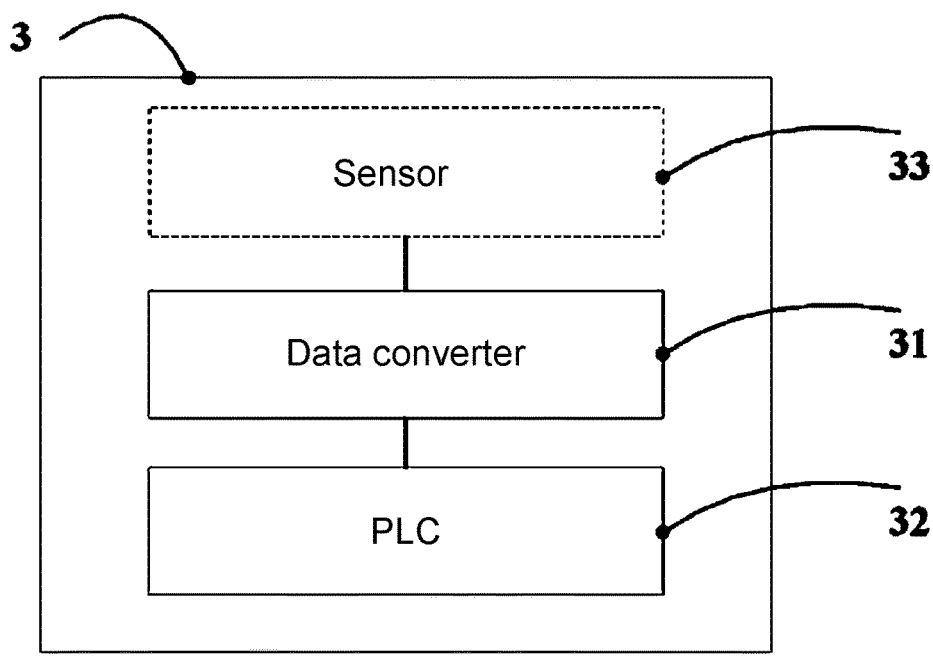
FIG. 5 is a schematic configuration view of a signal transmission system according to Embodiment 3 of the invention.

FIG. 5 is a schematic configuration view of a signal transmission system according to an embodiment of the invention. As shown in FIG. 5, a signal transmission system 3 may include a data converter 31 and a PLC 32. The data converter 31 communicates with the PLC 32, and the data converter 31 performs sampling multiple times with respect to data detected by a sensor in one communication period of communication with the PLC 32, acquires statistical data by statisticizing a plurality of sampling data in the communication period, and transmits the statistical data to the PLC 32 when the communication period is reached. The PLC 32 receives the statistical data transmitted by the data converter 31.

The data converter 31 and the PLC 32 may be directly connected through a circuit (e.g., connected through a bus), and through such connection, high-speed and highly reliable data transmission can be performed. Alternatively, the data converter 31 and the PLC 32 may be network-connected through a gateway to perform remote data transmission.

In an implementation of the present embodiment, as shown in FIG. 5, the signal transmission system 3 may further include a sensor 33, and the sensor 33 performs data detection and, for example, converts data such as temperature, weight, tension, etc. into a voltage or a current signal.

In the present embodiment, one or more functional blocks described in the drawings and/or one or more combinations of the functional blocks may be implemented by general-purpose processors, digital signal processors (DSPs), application-specific integrated circuits (ASICs), field programmable gate arrays (FPGAs), other programmable logic devices, discrete gates, or transistor logic devices, discrete hardware components, or any other suitable combinations to perform the functions described in the invention. The one or more functional blocks described in the drawings and/or one or more combinations of the functional blocks may also be implemented by combinations of computer devices. For example, a combination of a DSP and a microprocessor, a plurality of microprocessors, one or more microprocessors communicating with the DSP, or any other such configurations may be included.

The above apparatus and method of the invention are implemented by hardware and may also be implemented by combining software with hardware. The invention relates to such a computer-readable program, and when the program is executed by a logic component, the logic component is caused to implement the apparatus or component parts described above, or the logic component is caused to implement the various methods or processes described above. The invention also relates to a storage medium for storing the program described above, such as a hard disk, a magnetic disk, a CD, a DVD, a flash memory, etc.

Although the invention has been described by combining specific embodiments, it is clear to those skilled in the art that any of these descriptions is illustrative and does not limit the protection scope of the invention. Those skilled in the art may make various modifications and corrections to the invention based on the spirit and principle of the invention, and these modifications and corrections also fall within the scope of the invention.

INDUSTRIAL APPLICABILITY

A data converter, a signal transmission method, and a signal transmission system for transmitting a signal to a programmable logic controller are provided.

What is claimed is:

1. A data converter for transmitting a signal to a programmable logic controller, the data converter comprising:
    a processor configured to,
    use oversampling techniques to perform sampling multiple times with respect to data detected by a sensor in one communication period of communication with the programmable logic controller,
    acquire statistical data by statisicizing a plurality of sampling data in the one communication period, and
    transmit the statistical data to the programmable logic controller when the one communication period is reached.

2. The data converter according to claim 1, wherein a data amount of the statistical data is less than a data amount of the plurality of sampling data.

3. The data converter according to claim 1, wherein the statistical data comprise at least one or more of a maximum value, a minimum value, and an average value of the plurality of sampling data.

4. The data converter according to claim 1, wherein the processor sets a type of the statistical data based on control information of the programmable logic controller.

5. A signal transmission method for use in a data converter which communicates with a programmable logic controller, the signal transmission method comprising:
    a step of using, by the data converter, oversampling techniques to perform sampling multiple times with respect to data detected by a sensor in one communication period of communication with the programmable logic controller;
    a step of acquiring, by the data converter, statistical data by statisticizing a plurality of sampling data in the one communication period; and
    a step of transmitting, by the data converter, the statistical data to the programmable logic controller when the one communication period is reached.

6. The signal transmission method according to claim 5, wherein a data amount of the statistical data is less than a data amount of the plurality of sampling data.

7. The signal transmission method according to claim 5, wherein the statistical data comprise at least one or more of a maximum value, a minimum value, and an average value of the plurality of sampling data.

8. The signal transmission method according to claim 5, further comprising a step of setting, by the data converter, a type of the statistical data based on control information of the programmable logic controller.

9. A signal transmission system comprising a data converter and a programmable logic controller, wherein the data converter communicates with the programmable logic controller, wherein
    the data converter uses oversampling techniques to perform sampling multiple times with respect to data detected by a sensor in one communication period of communication with the programmable logic controller, acquires statistical data by statisticizing a plurality of sampling data in the one communication period, and transmits the statistical data to the programmable logic controller when the one communication period is reached, and the programmable logic controller receives the statistical data transmitted by the data converter.

10. A signal transmission system comprising a sensor, a data converter, and a programmable logic controller, wherein the data converter communicates with the sensor and the programmable logic controller, respectively, wherein the sensor performs data detection, the data converter uses oversampling techniques to perform sampling multiple times with respect to data detected by the sensor in one communication period of communication with the programmable logic controller, acquires statistical data by statisticizing a plurality of sampling data in the one communication period, and transmits the statistical data to the programmable logic controller when the one communication period is reached, and the programmable logic controller receives the statistical data transmitted by the data converter.

* * * * *